United States Patent [19]

Ota et al.

[11] Patent Number: 5,450,434
[45] Date of Patent: Sep. 12, 1995

[54] METHOD TO WORK CUBIC BORON NITRIDE ARTICLE

[75] Inventors: Nobuhiro Ota; Naoji Fujimori, both of Itami, Japan

[73] Assignee: Sumitomo Electric Industries, Ltd., Osaka, Japan

[21] Appl. No.: 66,243

[22] Filed: May 25, 1993

[30] Foreign Application Priority Data

May 26, 1992 [JP] Japan .................. 4-133299

[51] Int. Cl.⁶ ............................................. H01S 3/225
[52] U.S. Cl. ................................. 372/57; 219/121.69; 427/554; 427/555
[58] Field of Search ............... 51/293; 134/1, 38; 427/586, 596, 554, 555; 219/121.69, 121.66, 121.68, 121.85; 156/643; 372/57

[56] References Cited

U.S. PATENT DOCUMENTS

| | | | |
|---|---|---|---|
| Re. 33,777 | 12/1991 | Woodroffe | 134/1 |
| 4,828,874 | 5/1989 | Hiraoka et al. | 427/53.1 |
| 4,895,735 | 1/1990 | Cook | 427/596 |
| 4,957,775 | 9/1990 | Black et al. | 427/586 |
| 4,970,196 | 11/1990 | Kim et al. | 505/1 |
| 5,096,740 | 3/1992 | Nakagama et al. | 427/53.1 |
| 5,139,591 | 8/1992 | Doll et al. | 427/596 |
| 5,175,020 | 12/1992 | Doellein et al. | 427/586 |

OTHER PUBLICATIONS

Lambda Physik brochure, "LPX 100i, 200i, 300i Eximer Lasers", p. 3 (Mar. 1993).
"Function and Materials (Kino-Zairyo)", No. 11, vol. 13, p. 53 (1993) no month.
K. J. Schmatjko et al, "Feinbearbeitung von Keramik mit dem Excimerlaser" (Fine Machining of Ceramics with an Excimer Laser) Fachberichte Fur Metallbearbeitung, vol. 64, No. 4, 1987, (no month) pp. 294–296 and 298 and its abstract.
Patent Abstracts of Japan, vol. 14, No. 428 (M-1025) (4371) 14 Sep. 1990 & JP-A-21 69 192 (Denki Kagaki Kogyo K.K.) 29 Jun. 1990 *abstract*.
Patent Abstracts of Japan, vol. 10, No. 49 (C-330) 26 Feb. 1986 & JP-A-60 194 066 (Gijutsuin) 2 Oct. 1985 *abstract*.

*Primary Examiner*—Mark L. Bell
*Assistant Examiner*—Deborah Jones
*Attorney, Agent, or Firm*—Cushman Darby & Cushman

[57] ABSTRACT

The present invention provides a method for cutting or smoothing an article containing cubic boron nitride. In particular, the method comprises the step of irradiating a beam having a wavelength of not longer than 360 nm to the cubic boron nitride article so that the article is cut or smoothed quickly and with high accuracy.

7 Claims, No Drawings

METHOD TO WORK CUBIC BORON NITRIDE ARTICLE

BACKGROUND OF THE INVENTION

1. Field of the Invention

The present invention relates to a method for working an article that is composed, at least in part, of cubic boron nitride (hereinafter referred to as "a cubic boron nitride article"), which can be applied to a tool, a heat sink, and the like. In particular, the present invention provides a method for effectively and accurately cutting and etching a cubic boron nitride article and smoothing a surface of a cubic boron nitride article.

2. Description of Related Art

Cubic boron nitride articles are generally known for displaying high degrees of hardness. This attribute makes cubic boron nitride articles extremely difficult to work. For instance, where cubic boron nitride is grown of a single crystal, the article thereof can be conventionally worked by an abrasion grinding method. Such a conventional method only provides limited results, since abrasion grinding can only be performed along the plane orientation (or plane direction) of the single crystal cubic boron nitride article. By contrast, where cubic boron nitride is grown of a polycrystal, smoothing a surface of the cubic boron nitride article is extremely difficult, since the plane orientation of each grain which constitutes the polycrystal is arbitrary.

If the cubic boron nitride article is produced by a sintering method wherein a conductive sintering aid is used, a conventional electrical discharge method can be performed to cut the article. However, the electrical discharge method displays several limitations in terms of its applicability. For example, the electric discharge method can not be applied to a cubic boron article grown of a single crystal or to a non-conductive cubic boron nitride article, since conductive sintering aids are absent from such articles.

To overcome this problem, a conventional thermal cutting method incorporating a laser beam (e.g., $CO_2$, CO, or YAG lasers) has been used. Unfortunately, cubic boron nitride is transparent to each of these laser beams. Thus, utilization of such laser beams produces disadvantageous and ineffective results.

Heating and cutting a cubic boron nitride article with an infrared ray having a wavelength above 1 $\mu$m generates a hexagonal crystal phase, thereby disturbing the crystallinity of the article. As a result, the hexagonal crystal phase can altogether prevent the article from being cut. Alternatively, attempts to cut a cubic boron nitride article having a hexagonal phase can cause contamination at the cut surface. In addition, an area in the vicinity of the cut region is degraded by heat from the infrared ray. Further, because a relatively wide cutting margin is required, working accuracy is impeded.

Similarly, cutting a cubic boron nitride article by means of a conventional laser beam produces a high degree of heat, which degrades the cubic crystal structure around the vicinity of the cut region. The degraded region can generally be mechanically scraped off by, for example, an abrasion method. Smoothing a cubic boron nitride article by means of a conventional laser beam also results in a disadvantageous thermal degradation of the cubic crystal structure around the vicinity of the cut region. In addition, when attempting to smooth a cubic boron nitride article by a conventional laser beam, the laser beam often reaches an interior or base portion of the article, producing further adverse consequences. To overcome these disadvantages, an angle of incidence of the laser beam should be limited so as to only irradiate a surface layer of the cubic boron nitride article. Alternatively, a means may be incorporated for suppressing the scattering of the laser beam at the surface of the article.

Abrasion treatment often affects the cubic boron nitride article in an undesirable manner. Grinding the cubic boron nitride article by an abrasion technique can heat the article to several hundred degrees centigrade (e.g., 900° C.). However, it is known that cubic boron nitride structure begins to transform to the hexagonal crystal at temperatures above one thousand degrees centigrade. In addition, abrasion treatment can make the fixing of the cubic boron nitride difficult. In particular, cubic boron nitride articles possessing diminutive sizes or irregular shapes are extremely difficult to work. In some cases, it is impossible to work the article by the abrasion technique. In addition, abrasion treatment often requires the expenditure of a large amount of time.

SUMMARY OF THE INVENTION

It is therefore an object of the present invention to resolve the aforementioned problems associated with the prior art as well as other problems by providing a process for working a cubic boron nitride article without adversely affecting the article or the working conditions (e.g., speed).

Accordingly, the present invention provides a method for working a cubic boron nitride article in which a beam having a wavelength of not longer than 360 nm, preferably in a range of 190 to 360 nm, and more preferably 190 to 310 nm (e.g., 308 nm of XeCl excimer laser, 248 nm of KrF excimer laser, and 193 nm of ArF excimer laser) is irradiated to a surface of the article. The term "cubic boron nitride article" is used herein to describe an article which is made essentially of cubic boron nitride, comprises cubic boron nitride, or a portion of which is made of cubic boron nitride.

An energy density of the beam used in accordance with the present invention is preferably in a range of 10 $W/cm^2$ to $10^{11}$ $W/cm^2$ and more preferably $10^2$ $W/cm^2$ to $10^4$ $W/cm^2$. The beam is preferably irradiated using a pulsed excimer laser. When a pulsed laser is used, an energy density of the beam per pulse is preferably in the range of $10^{-1}$ $J/cm^2$ to $10^6$ $J/cm^2$, and more preferably in the range of 1 $J/cm^2$ to $10^2$ $J/cm^2$.

A laser apparatus is constructed so that a diverging angle of the beam emitted from a laser oscillator is in a range of $10^{-3}$ mrad to 5 mrad, and preferably in a range of $10^{-2}$ mrad to $5 \times 10^{-1}$ mrad. The laser apparatus is further constructed so that a full width at half maximum of an oscillating spectrum of the beam is in a range of $10^{-4}$ nm to 1 nm, and preferably in a range of $10^{-4}$ nm to $10^{-2}$ nm. A beam energy uniformity of a section that is perpendicular to the laser beam is preferably within a range below 10%, and preferably below 7%. In order to provide improved results, the pulsed laser beam is converged using a cylindrical lens or a cylindrical mirror or a combination thereof.

DESCRIPTION OF THE PREFERRED EMBODIMENTS

A detailed description of the present invention is provided below.

It is known that a large amount of beam is absorbed by cubic boron nitride when the beam possesses a wavelength that is shorter than that of an ultraviolet beam. Absorption of such a beam by the nitride contributes to the excitation of an electron forming a chemical bond. In particular, it is understood that by irradiating a nitrogen-boron bond (which is present in a cubic boron nitride article) a beam having a wavelength below 360 nm may effect some changes to the nitrogen-boron bonds. However, persons skilled in the art have viewed the working of a cubic boron nitride article by means of an ultraviolet beam as highly inconceivable, in view of the firm construction and three dimensional covalent bonds of a cubic boron nitride article.

In accordance with the present invention, intensive studies have been performed on the reaction of a laser beam with a cubic boron nitride article. The studies have indicated that the cubic boron nitride article is effectively worked by a laser beam having a wavelength below 360 nm without damaging the article. In addition, the studies where performed on cubic boron nitride articles produced by a sintering method wherein a conductive sintering aid was used. These studies indicated that such sintered articles are effectively worked by a laser beam having a wavelength of 360 nm, without altering the sintering aid or contaminating the surface of the article by the sintering aid. In particular, it has been found that a laser beam having a wavelength in a range of 190 nm to 360 nm is useful for working the cubic boron nitride article. The beam possessing the above-specified wavelength is absorbed only by the surface layer of the cubic boron nitride article and does not invade the interior or base of the article. Therefore, the beam's energy is properly and effectively concentrated on the selected region to be worked. In the case where a surface of a cubic boron nitride article is to be smoothed, the beam energy is concentrated solely on the selected surface. The dependency on the incidence angle of the beam is thereby suppressed, and undesirable consequences to other areas of the article is prevented.

As an example of a source of the beam, an excimer laser of $F_2$, ArF, KrCl, KrF, XeCl, $N_2$, or XeF, a mercury vapor lamp, or synchrotron radiation (SOR) may be used in accordance with the method provided by the present invention. However, it is understood that the source is not limited to the above-mentioned examples. The above-mentioned excimer lasers have an inherent oscillating beam wavelength of 157, 193, 222, 248, 308, 337, and 353 nm, respectively. The mercury lamp and the SOR each provides a beam having a consecutive wavelength band (band width). It is also possible to irradiate the beam having such a consecutive band width. Alternatively, the band width may be narrowed by means of an optical filter or the like.

Generally, the beam emitted from the above-described source is not parallel and therefore freely diverges within a certain flare range. Converging the beam by means of a lens causes the formation of a portion in a periphery region of the converged beam which possesses a lesser energy density. Working accuracy is decreases as a result. Where a converged beam is used for a smoothing operation performed on the article surface, scanning the article with respect to the beam reduces this problem. However, where the converged beam is used for a cutting operation, the cutting edge becomes blunted. Although such a defect may not cause a serious problem for a normal application, forming a parallel beam is necessary for precise working in the order of sub-micron.

Several methods exists for parallelizing the beam emitted from the excimer laser and narrowing its band width. Such methods include oscillation with an unstable resonator, or narrowing the band width of the original beam with either an etalon or prism and grating, and thereafter amplifying the narrowed beam. By reducing a diverging angle of the laser beam from the laser oscillator from 1–3 mrad to less than $5 \times 10^{-1}$ mrad, the converging effect of the beam with the lens can be improved. The angle formed between a cut surface and the other intact surface of the cubic boron nitride is consequently made sharp, which is effective for smoothness of the cut surface. It is difficult to reduce the diverging angle to less than $10^{-2}$ mrad. This is of little consequence, since further reduction of the angle will not produce a corresponding degree of improvement in the effectiveness of the working method.

In addition, when a very precise working conditions are desired such that a beam having wavelength of 0.1 μm or less is required, the narrowing of the band width of the beam is useful. As above, by way of example, the band width of the original beam may be narrowed by either an etalon or a prism and grating. With respect to the extent of narrowing of the band width of the oscillating spectrum of the beam, the laser apparatus is constructed so that a full width at half maximum of an oscillating spectrum of the beam is in a range of $10^{-4}$ nm to 1 nm, and preferably in a range of $10^{-3}$ nm to $10^{-2}$ nm. A full width of half maximum above 1 nm is not sufficiently narrowed for the purposes of precision working as described above. The width below $10^{-4}$ nm does not provide sufficient energy for working in accordance with the present invention.

In a process wherein the laser beam is converged and irradiated to the surface of the cubic boron nitride article, a lens or a total reflection mirror or both are typically used. A convex lens or a concave mirror or a combination thereof may be used which to the beam on a point. Optionally, a cylindrical convex lens or a cylindrical concave mirror or a combination thereof may be used to converge the beam on a line. In addition, a concave lens or a convex mirror or a combination thereof provide a parallel or almost parallel beam which has a small diverging angle. The energy density of the irradiated beam is controlled by an extent to which the beam is converged.

The positioning of the beam with respect to the cubic boron nitride article is determined by the shape of the article and the type of method to be conducted on the article. For instance, when the cubic boron article is worked, the beam can be scanned. However, when the article is plan-like, sliding the article leads to more precise results. By contrast, when the article has a three dimensional configuration is to be smoothed, both the article and the beam should be moved relative to each other. Where the article is to be cut, the beam irradiation angle should be set such that the beam is perpendicular to the surface of the article to be cut. Such an angle is effective with respect to both the energy density and the perpendicularity of the cut surface. By contrast, the effectiveness of the smoothing operation depends on the beam irradiation angle.

Depending on the relationship between the energy density and the irradiation region (i.e., the worked area), optimal conditions may be selected. The energy density may be adjusted by changing the focal length of the convex lens or the concave mirror and/or changing the positional relationship between the article and the convex lens or the concave mirror. When the energy density is less than $10^{-1}$ J/cm$^2$ or less than 10 W/cm$^2$, the energy is not sufficient for decomposition of the cubic boron nitride. On the other hand, when the energy density is greater than $10^6$ J/cm$^2$ or greater than $10^{11}$ W/cm$^2$, a region outside of the irradiation region is adversely effected (e.g., degradation of the cubic boron nitride article).

Generally, it has been discovered that when conventional methods are used for working a cross-sectional area of a cubic boron nitride article which is positioned perpendicular to the excimer laser beam and has a rectangular shape with the dimensions 10 mm×20 mm, the energy profile across the sectional area of the beam is not uniform. Instead, an energy distribution is produced that has a gentle convex configuration such that the energy density is low along the peripheral region of the rectangular area and greater in the central region. Use of the above-described conventional laser beam having a nonuniform energy density provides convex and concave portions on the surface of the worked article. Even when the beam is converged using the lens, the beam still produces a nonuniform energy density and a nonuniform worked surface.

However, according to the present invention, a method has been discovered and disclosed herein whereby a cubic boron nitride article may be worked with high speed such that the surface thereof is uniformly smooth or accurately cut. According to the disclosed method, the above-mentioned excimer laser beam having a nonuniform energy density is converged on a line by using the cylindrical lens. Next, the converged beam is irradiated to the cubic boron nitride article to perform the desired work thereon.

An explanation for the improved results displayed by the method disclosed herein is not currently clear. It is believed that the converging of the laser beam in one direction produces the unexpected results disclosed herein. Notwithstanding this hypothesis, it is understood that the scope of this invention is not bound by any particular theory for explaining these unexpected improved results.

Depending on the conditions of the excimer laser, the line-converged beam may provide non-uniformity at the both end portions of the worked surface. To overcome this problem, the end portions of the line-converged beam may be blocked, thereby providing a more uniformly worked surface. In addition, it has been discovered that when the scattering of the energy density distribution across the section of the laser beam is reduced to less than ten percent, almost no adverse effect is caused to the working accuracy. In order to achieve a uniform energy density distribution, a homogenizer may be used. Alternatively, the central portion may be cut out from the beam by using masking means in which the energy density distribution is relative uniform.

It has also been discovered that the atmosphere in which the working method is carried out depends on the laser beam used. For example, when an ArF excimer laser is used, an inert atmosphere (e.g., an atmosphere comprising at least one inert gas such as helium or argon) or a vacuum atmosphere is suitable so as to prevent energy damping due to absorption by oxygen. When a beam having a wavelength greater than that of the ArF excimer laser beam is used, an inert atmosphere such as a helium atmosphere is preferred. Since the F$_2$ excimer laser or SOR emits a vacuum ultraviolet beam, the working should be carried out in a high vacuum condition, converging the beam using the total reflection mirror.

When a pulsed laser is used, the working rate is proportionally increased with a frequency of the pulse. Thus, it is preferred that the laser oscillator used provides the pulsed laser beam at a high frequency. The higher the energy density is, the faster the etching rate. Thus, an apparatus which can provide a high energy beam is suitable for cutting.

The present invention provides an effective method for working with great accuracy a cubic boron nitride article. It is believed that the method disclosed herein will extend the application of working cubic boron nitride articles into fields which previously viewed conventional working methods as uneconomical and ineffective. In addition, the present invention provides a three dimensional working method for working cubic boron nitride articles with high accuracy, as described in detail in the following Examples.

EXAMPLES OF PREFERRED EMBODIMENTS

Example 1

An article made essentially of a cubic boron nitride single crystal produced by the ultra-high pressure synthesizing process was cut using an excimer laser. The article was in the form of a particle having the dimensions 1 mm×1 mm×500 μm (thickness). A pulsed ArF laser apparatus was used as the excimer laser. The beam from the laser was narrowed in its band width through a prism and a grating, and an unstable resonator was positioned on an amplifying side of the laser apparatus so as to improve the parallelism of the beam, so that the band width of the beam having a oscillating wavelength of 193 nm was narrowed such that a full width of the half maximum was $5\times10^{-3}$ nm. The beam was converged on a 10 μm ×10 μm square in its section with a combination of a convex lens and a concave lens, each made of a synthesized quartz and irradiated to a surface to be worked of the boron nitride article in the air.

The energy density of the beam was $10^5$ J/cm$^2$. The repeating frequency of the pulse was set to 200 Hz. The irradiating angle was set such that the beam was irradiated parallel to a normal of the surface to be worked of the cubic boron nitride article. While remaining perpendicularly to the article, the laser beam was moved over a length of 1 mm at a rate of 0.1 mm/sec. Thus, it took ten seconds to cut the article. When the resulting cut surface was checked using an electron microscope, no morphology change was observed in the periphery region of the cut surface. In addition, the cut surface itself was extremely smooth and no formed hexagonal crystal phase was observed thereon.

Example 2

An article made essentially of the cubic boron nitride single crystal produced by the ultra-high pressure synthesizing process was cut using an excimer laser. The article was in the form of a particle having the dimensions of 2 mm×2 mm×2 mm (thickness). A pulsed ArF laser was used as the excimer laser. The beam from the laser was converged on a 2 mm×10 μm rectangular section using a cylindrical convex lens made of the synthesized quartz and irradiated to the article to be cut in a helium gas flow. The energy density of the beam was $10^4$ J/cm$^2$. The repeating frequency of the pulse was set to 250 Hz.

The irradiating angle was set such that the beam was irradiated parallel to a normal of the surface of the cubic boron nitride article. The article having a thickness of 2 mm was cut in 30 seconds. When the cut surface was observed using the electron microscope, no morphology change was observed in the periphery region of the cut surface. In addition, the cut surface itself was extremely smooth and no formed hexagonal crystal phase was observed thereon.

Example 3

A surface of a sintered article made of cubic boron nitride comprising calcium boron nitride as the sintering aid was smoothed using an excimer laser. The sintered article was produced under high pressure and high temperature conditions. The article was in the form of a plate having the dimensions 50 mm×50 mm×5 mm (thickness). The surface was relatively rough. Concretely, its roughness was 1.0 μm of Ra measured by a surface roughness meter using a stylus ("DEKTAK ®" commercially available from Sloan Co. in U.S.A.). A pulsed XeF laser was used as the excimer laser. On the amplifying side of the laser apparatus, an instable resonator was positioned, so that the parallelism of the beam was highly improved and the scattering of the energy distribution was not greater than 9% with the use of a homogenizer.

The beam from the laser was converged on a 25 mm×50 μm rectangular section using a cylindrical convex lens and a cylindrical concave lens, each made of the synthesized quartz glass, and irradiated to the article surface to be smoothed in the air. The energy density of the beam was $10^2$ J/cm$^2$. The repeating frequency of the pulse was set to 200 Hz. The irradiating angle was set such that it was parallel to a normal of the surface to be smoothed of the cubic boron nitride article. The article was moved while remaining perpendicular to the laser beam. Practically, the article was scanned back and forth over one half of the 50 mm width (i.e. 25 mm) at a scanning rate of 5 mm/sec. This scanning was repeated five times such that it took 50 seconds. In the same manner, the other half was also smoothed by scanning.

The electron microscope observation revealed that the resulting surface had almost no roughness. Concretely, its roughness was 0.15 μm of Ra. In addition, the worked surface had no hexagonal crystal phase thereon.

Example 4

A sintered article made of cubic boron nitride and a sintering aid of calcium boron nitride was cut using an excimer laser. The article was produced in a manner similar to that of Example 3 and in the form of a plate having the dimensions 50 mm×50 mm×5 mm (thickness). As the excimer laser, a pulsed ArF laser was used. On the amplifying side of the laser apparatus, the instable resonator was positioned, so that the parallelism of the beam was highly improved. The scattering of the energy density distribution was not greater than 9% using the homogenizer.

The beam from the laser was converged on a 25 mm×50 μm rectangular section using a combination of a cylindrical convex lens and a cylindrical concave lens, each made of the synthesized quartz, and irradiated to the article to be worked in a helium flow. The energy density of the beam was $10^3$ J/cm$^2$. The repeating frequency of the pulse was set to 250 Hz. The irradiating angle was set such that it was parallel to a normal of the surface to be worked of the cubic boron nitride article. The article was moved while remaining perpendicular to the laser beam. The article was then cut over its length of 50 mm; the beam was irradiated over a half of the 50 mm for 180 seconds, and then the beam was shifted so that the rest of the 50 mm (i.e. the remaining 25 mm) was also irradiated. Thus, the article was completely cut in 360 seconds.

According to the electron microscope observation, the cut surface was smooth and no hexagonal crystal phase was observed thereon. In addition, neither degradation of the sintering aid nor contamination due to the presence of the aid itself were observed.

Example 5

A sintered article was worked using an excimer laser. The article was produced by sintering cubic boron nitride produced by the ultra-high pressure synthesizing process and a sintering aid of magnesium boron nitride. The article was in the form of a disc having a thickness of 5 mm and a diameter of 50 mm. A pulsed KrF laser emitting a beam having a wavelength of 248 nm was used as the excimer laser. The beam from the laser was converged to a 25 mm×500 μm rectangular section using a cylindrical convex lens and a cylindrical concave lens, each made of the synthesized quartz, and irradiated to the article surface to be worked while a helium gas was sprayed on the surface of the article. The energy density of the beam was 10 J/cm$^2$. The repeating frequency of the pulse was set to 80 Hz.

The irradiation angle was set such that the beam and a normal of the surface of the article formed an angle of 75°. In addition, the article was gradually inclined with respect to the beam such that the beam width was increased toward the center of the article surface. The energy density of the beam was thereby decreased toward the center, so that the energy density across the irradiated surface became uniform as a whole. The article was worked while it was rotated on a turntable at a turning rate of 0.1 rpm. After the working step was completed the thickness of the article was measured. It was found that the thickness was uniformly decreased by 100 μm. The roughness of the surface (Ra) was measured by the surface roughness meter using the stylus and found to be 0.1 μm of Ra.

Example 6

A plane (111) of a cubic boron nitride single crystal was worked using an excimer laser. The single crystal was in the form of a hexa-octahedron having an edge of about 2 mm. A pulsed KrF excimer laser was used. The beam from the laser was converged on a 2 mm×10 μm rectangular section using a convex lens made of the synthesized quartz with the mask projection technique using a slit means. The converged laser beam was irradiated to the surface of the cubic boron nitride crystal in a helium gas flow. The energy density of the beam was 53 J/cm$^2$. The repeating frequency of the pulse was set to 100 Hz.

The irradiation angle was set such that the beam was perpendicular to a normal of the surface to be worked. The crystal was moved using a numerically controlled driving mechanism, so that a flank and a rake face each corresponded to the (1 1 1) surface. The beam was irradiated to the flank perpendicularly from a side surface direction thereof to have an edge portion having a radius of 3 mm. It took 12 minutes to complete the working. According to SEM (scanning electron microscope) observation, the edge was extremely sharp and no thermally degraded portion was detected.

Example 7

A (1 1 1) plane of a cubic boron nitride single crystal was worked using an excimer laser. The single crystal was in the form of a hexa-octahedron having an edge of about 2 mm. A pulsed KrF excimer laser was used. The beam from the laser was converged on a 2 mm $\times$ 10 $\mu$m rectangular section using a convex lens made of the synthesized quartz with the mask projection technique using the slit means. The converged laser beam was irradiated to the surface of the cubic boron nitride crystal while air was sprayed to the surface with a compressor. The spraying rate of the air was 50 m/sec. The energy density of the beam was 53 J/cm$^2$. The repeating frequency of the pulse was set to 100 Hz. The irradiation angle was set such that the beam was perpendicular to a normal of the surface. The crystal was moved using the numerically controlled driving mechanism so that a flank corresponded to the (1 1 1) plane. The beam was irradiated to the flank perpendicularly to have a cutting edge portion having a radius of 3 mm. It took 12 minutes to complete the working. According to the SEM observation, the edge was extremely sharp and no thermally degraded portion was detected.

Comparative Example 1

By using a mechanical abrasion process (skiving abrasion), a (1 1 1) plane of the cubic boron nitride single crystal was worked. The single crystal was in the form of a hexa-octahedron having an edge of about 2 mm. While a skiving face is abutted to the (1 1 1) plane, a cutting edge portion having a radius of 4 mm was formed so that a flank corresponded to the (1 1 1) plane. It took 45 minutes for forming the cutting edge portion. According to the SEM observation, the edge portion was blunted a little and some thermally degraded portions were observed.

Comparative Example 2

A sintered article comprising cubic boron nitride produced by the ultra-high pressure synthesizing process and calcium boron nitride as the sintering aid was cut using a whetstone made of a metal bonded diamond. The article was in the form of a disc having a diameter of 50 mm and a thickness of 5 mm. It took 50 hours to scrape off a surface layer having a thickness of 100 $\mu$m from the article. When the roughness of the surface was measured by a roughness meter, waviness having a maximum roughness (Rmax) of about 5 $\mu$m was observed, which seemed to be caused by deformation of the worked article.

What is claimed is:

1. A method for working an article at least a portion of which is made of boron nitride, said method comprising the step of irradiating a beam to a surface of the article, wherein the beam has a wavelength of not greater than 360 nm, wherein the boron nitride is cubic boron nitride, and wherein the beam is emitted from a pulsed laser and a diverging angle of the beam emitted from a laser oscillator is in a range of 10$^{-2}$ mrad (milliradian) to 5$\times$10$^{-1}$ mrad.

2. The method according to claim 1 wherein the wavelength is not smaller than 190 nm.

3. The method according to claim 1 wherein an energy density of the beam is in a range of 10 W/cm$^2$ to 10$^{11}$ W/cm$^2$.

4. The method according to claim 1 wherein an energy density per pulse is in a range of 10$^{-1}$ J/cm$^2$ to 10$^6$ J/cm$^2$.

5. The method according to claim 1 wherein a full width of half maximum of an oscillating spectrum of the laser beam is in a range of 10$^{-4}$ nm to 1 nm.

6. The method according to claim 1 wherein a scattering extent of an energy density across a cross section of the beam is not greater than 10%.

7. The method according to claim 1 wherein the beam is converged using at least one of a cylindrical lens and a cylindrical mirror.

* * * * *

UNITED STATES PATENT AND TRADEMARK OFFICE
CERTIFICATE OF CORRECTION

PATENT NO.   : 5,450,434

DATED        : September 12, 1995

INVENTOR(S)  : OTA et al

It is certified that error appears in the above-identified patent and that said Letters Patent is hereby corrected as shown below:

```
On the title page, item:

[56] References Cited, add the following:

FOREIGN PATENT DOCUMENTS
   4119878     12/1992     Germany
```

Signed and Sealed this

Twenty-sixth Day of December, 1995

Attest:

BRUCE LEHMAN

*Attesting Officer*   *Commissioner of Patents and Trademarks*